(12) United States Patent
Lang et al.

(10) Patent No.: US 12,381,453 B2
(45) Date of Patent: Aug. 5, 2025

(54) ROTOR POSITION SENSOR AND MOTOR ASSEMBLY

(71) Applicant: Bayerische Motoren Werke Aktiengesellschaft, Munich (DE)

(72) Inventors: Markus Lang, Munich (DE); Martin Lasch, Neufahrn bei Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 164 days.

(21) Appl. No.: 17/788,021

(22) PCT Filed: Dec. 8, 2020

(86) PCT No.: PCT/EP2020/085035
§ 371 (c)(1),
(2) Date: Jun. 22, 2022

(87) PCT Pub. No.: WO2021/139943
PCT Pub. Date: Jul. 15, 2021

(65) Prior Publication Data
US 2023/0024481 A1 Jan. 26, 2023

(30) Foreign Application Priority Data
Jan. 9, 2020 (DE) .................... 10 2020 100 271.8

(51) Int. Cl.
*H02K 11/21* (2016.01)
*G01B 7/30* (2006.01)
(Continued)

(52) U.S. Cl.
CPC ............ *H02K 11/225* (2016.01); *G01B 7/30* (2013.01); *G01D 5/20* (2013.01); *H02K 5/10* (2013.01)

(58) Field of Classification Search
CPC ........ H05K 5/068; H02K 11/21; H02K 11/22; H02K 11/225; H02K 24/00; H02K 5/10; G01B 7/30; G01D 5/20
(Continued)

(56) References Cited

U.S. PATENT DOCUMENTS 4,577,127 A  3/1986  Ferree et al.
4,612,501 A * 9/1986  Costello ............... G01D 11/30
                                                  411/525
(Continued)

FOREIGN PATENT DOCUMENTS

CN       109153374 A      1/2019
DE  10 2011 012 632 A1   8/2012
(Continued)

OTHER PUBLICATIONS

International Search Report (PCT/ISA/210) issued in PCT Application No. PCT/EP2020/085035 dated Mar. 3, 2021 with English translation (six (6) pages).
(Continued)

*Primary Examiner* — Burton S Mullins
(74) *Attorney, Agent, or Firm* — Crowell & Moring LLP

(57) ABSTRACT

A rotor position sensor for a motor vehicle for sensing the rotational position of a rotor of an electric motor includes a sensor housing, in which the components of the rotor position sensor are accommodated. At least part of the sensor housing forms a cover for closing a motor housing of the electric motor.

7 Claims, 2 Drawing Sheets

(51) Int. Cl.
*G01D 5/20* (2006.01)
*H02K 5/10* (2006.01)
*H02K 11/225* (2016.01)

(58) Field of Classification Search
USPC ............ 310/68 B; 73/493; 324/200, 217.11, 324/207.13, 207.2
See application file for complete search history.

(56) References Cited

U.S. PATENT DOCUMENTS

| | | | | |
|---|---|---|---|---|
| 5,184,038 | A * | 2/1993 | Matsui | H02K 29/10 |
| | | | | 310/68 B |
| 5,514,955 | A * | 5/1996 | Griffen | G01P 3/487 |
| | | | | 324/262 |
| 6,154,975 | A * | 12/2000 | Steinich | G01B 3/1084 |
| | | | | 33/763 |
| 6,506,110 | B1 * | 1/2003 | Borisch | H05K 5/0213 |
| | | | | 361/678 |
| 6,949,851 | B2 * | 9/2005 | Wysk | H02K 11/33 |
| | | | | 310/88 |
| 7,465,101 | B2 * | 12/2008 | Hoefs | F16F 1/324 |
| | | | | 384/517 |
| 8,089,040 | B2 * | 1/2012 | Yuan | G01D 15/00 |
| | | | | 250/239 |
| 8,120,219 | B2 * | 2/2012 | Then | H02K 11/21 |
| | | | | 310/89 |
| 8,188,628 | B2 * | 5/2012 | Bahr | H02K 11/21 |
| | | | | 310/68 B |
| 8,492,946 | B2 * | 7/2013 | Vedy | H02K 1/28 |
| | | | | 310/68 B |
| 10,566,878 | B2 * | 2/2020 | Lindblom | H02K 5/02 |
| 10,727,714 | B2 * | 7/2020 | Bähr | H02K 15/14 |
| 10,768,028 | B2 * | 9/2020 | Biegert | G01D 5/145 |
| 2002/0175574 | A1 * | 11/2002 | Okazaki | H02K 3/50 |
| | | | | 310/68 B |
| 2004/0145259 | A1 | 7/2004 | Wysk et al. | |
| 2011/0241498 | A1 | 10/2011 | Vedy | |
| 2014/0300228 | A1 | 10/2014 | Rapp et al. | |
| 2019/0199159 | A1 | 6/2019 | Cox et al. | |
| 2019/0346023 | A1 * | 11/2019 | Kamiya | F16H 1/32 |
| 2020/0303986 | A1 | 9/2020 | Stubner et al. | |

FOREIGN PATENT DOCUMENTS

| | | | |
|---|---|---|---|
| DE | 10 2013 005 731 A1 | 10/2014 | |
| DE | 10 2016 204 954 A1 | 9/2017 | |
| DE | 10 2017 223 491 A1 | 6/2019 | |
| DE | 10 2018 218 529 A1 | 4/2020 | |
| EP | 1 441 431 A1 | 7/2004 | |
| JP | 2003-23761 A | 1/2003 | |
| JP | 2005-160296 A | 6/2005 | |
| JP | 2008-11661 A | 1/2008 | |
| JP | 2008011661 A * | 1/2008 | ............... H02K 5/10 |
| JP | 2015-65713 A | 4/2015 | |

OTHER PUBLICATIONS

German-language Written Opinion (PCT/ISA/237) issued in PCT Application No. PCT/EP2020/085035 dated Mar. 3, 2021 (five (5) pages).
German-language Search Report issued in German Application No. 10 2020 100 271.8 dated Oct. 1, 2020 with partial English translation (12 pages).
Chinese-language Office Action issued in Chinese Application No. 202080079651.8 dated Nov. 21, 2024 with English translation (15 pages).
Chinese-language Office Action issued in Chinese Application No. 202080079651.8 dated Jun. 28, 2024 with English translation (18 pages).

* cited by examiner

ROTOR POSITION SENSOR AND MOTOR ASSEMBLY

BACKGROUND AND SUMMARY OF THE INVENTION

The invention relates to a rotor position sensor for a motor vehicle and to a motor assembly comprising an electric motor and a rotor position sensor.

In electric motors, in particular in permanent-magnet synchronous machines or in current-excited synchronous machines, it is necessary to ascertain a rotational position of a rotor in order to drive the electrical machine. A position of this kind is usually determined using what is known as a rotor position sensor which, for its part, comprises a rotor position sensor rotor and a rotor position sensor stator.

In accordance with the position of the rotor, the individual coils in the stator of the electric motor have to be supplied with high voltage in succession in order to generate a rotating magnetic field.

The rotor position sensors are generally installed inside the motor and delimited with respect to the outside by an additional housing part.

Disadvantages of this are that a relatively large (axial) installation space and a large number of components are required.

An object of the invention is therefore to provide a rotor position sensor and a motor assembly comprising a rotor position sensor, which allow a particularly cost-effective and compact design.

According to embodiments of the invention, this object is achieved by a rotor position sensor for a motor vehicle for sensing the rotational position of a rotor of an electric motor, wherein the rotor position sensor comprises a sensor housing, in which the components of the rotor position sensor are accommodated, and wherein at least a portion of the sensor housing forms a cover for closing a motor housing of the electric motor.

This has the advantage that a separate cover, in which the rotor position sensor is arranged, for closing the motor housing of the electric motor is not required. As a result, the rotor position sensor or the entire motor assembly is optimized in respect of the installation space required and in terms of costs. Owing to the integration of the cover in the rotor position sensor, a separate cover can be dispensed with in particular. The reduced number of components has a particularly advantageous effect on the production costs.

The rotor position sensor is preferably an inherently closed unit. This means that the rotor position sensor can be obtained as a preassembled unit and can be installed in a single assembly step during final assembly.

The components arranged in the sensor housing are, for example, coils, lines to the coils and a control and/or evaluation unit which is connected to the lines in a signal-transmitting manner.

The sensor housing is preferably an injection-molded component. As a result, complex geometries can be produced on the sensor housing in a cost-effective manner. However, depending on requirements, the sensor housing can also be a milled part.

The material of the sensor housing may be a metal material or a plastic.

According to one embodiment, the sensor housing has a flange for fastening the rotor position sensor to the motor housing of the electric motor. In this way, the rotor position sensor can be fastened in a particularly simple manner, for example using screws or other fasteners. The flange is preferably provided with fastening or screw-on brackets.

In this case, the cover is formed, in particular, by a projecting region of the sensor housing, for example the flange, together with one side of the sensor housing.

A seal for sealing off the motor housing of the electric motor can be provided on the outside of the rotor position sensor, in particular on the outside of the sensor housing. This seal may be designed as an O-ring or as a liquid seal. The rotor position sensor can thereby also close a motor housing in a fluid-tight manner in the assembled state. Depending on requirements, sealing-off in accordance with all IPXX classes is possible, that is to say the sealing-off can be dust-tight, fluid-tight and/or gas-tight, by suitable design of the seal. The assembly of the electric motor, in which the rotor position sensor is arranged, is further simplified since a seal is arranged on the sensor housing. In particular, the seal does not have to be handled separately.

The seal is preferably arranged in an encircling groove or on a sealing surface on the sensor housing. Owing to the provision of a groove, the seal is firstly mounted in a captive manner before assembly and secondly the seal is prevented from slipping during assembly of the rotor position sensor. The groove also provides a clear positioning location for the seal, so that faulty assembly can be effectively avoided. In the case of a liquid seal, the seal can be applied to the sealing surface.

According to one embodiment, the sensor housing has a contact area which serves for making contact with a spring element. In particular, the contact area serves for retaining the spring element and thereby for pretensioning a roller bearing when the rotor position sensor is assembled. The number of components required can be further reduced in this way. In particular, a separate bearing ring for positioning the spring element is not required. The assembly is also simplified since the spring element is automatically positioned when the rotor position sensor is inserted.

The contact area is formed, for example, on an encircling, radially outwardly extending collar on the sensor housing. A collar of this kind can be formed on the sensor housing in a particularly simple manner, for example when injection molding the sensor housing.

According to one embodiment, a pressure equalization element is integrated in the sensor housing. Therefore, a separate pressure equalization element does not have to be fitted and the number of parts required is reduced, this having an advantageous effect on the assembly time and on the total costs.

Furthermore, a cable bushing for a sensor cable can be provided in the sensor housing, and/or a sensor cable can be at least partially integrated in the sensor housing. The sensor cable is integrated, for example, by way of being encapsulated by injection molding, that is to say having been integrated into the sensor housing during production of the sensor housing. This substantially simplifies the assembly since the sensor cable does not have to be manually threaded through a corresponding cutout. As an alternative or in addition, a corresponding cable bushing can be provided, which allows subsequent fitting of the sensor cable and simple replacement of the sensor cable, for example in the event of a fault. The installation of a plug into the sensor housing is additionally dispensed with owing to the provision of a cable bushing.

As is clear from the above description, various functions can be integrated in the rotor position sensor according to embodiments of the invention. Therefore, the rotor position sensor according to embodiments of the invention is a highly integrative rotor position sensor. As a result, firstly the installation space (axially) required is significantly reduced and secondly the number of components to be installed during final assembly is reduced.

According to embodiments of the invention, the object is furthermore achieved by a motor assembly comprising an electric motor, which is accommodated in a motor housing, and comprising a rotor position sensor which is designed as described above. The rotor position sensor is at least partially received in the motor housing and fastened to the motor housing. The rotor position sensor closes the motor housing with respect to the outside at least on the side on which the rotor position sensor is received in the motor housing.

As already described in connection with the rotor position sensor, an additional cover for closing the motor housing can be dispensed with in this way.

Further advantages and features of the invention can be found in the following description and in the appended drawings, to which reference is made.

DETAILED DESCRIPTION OF THE DRAWINGS

Figure 1:
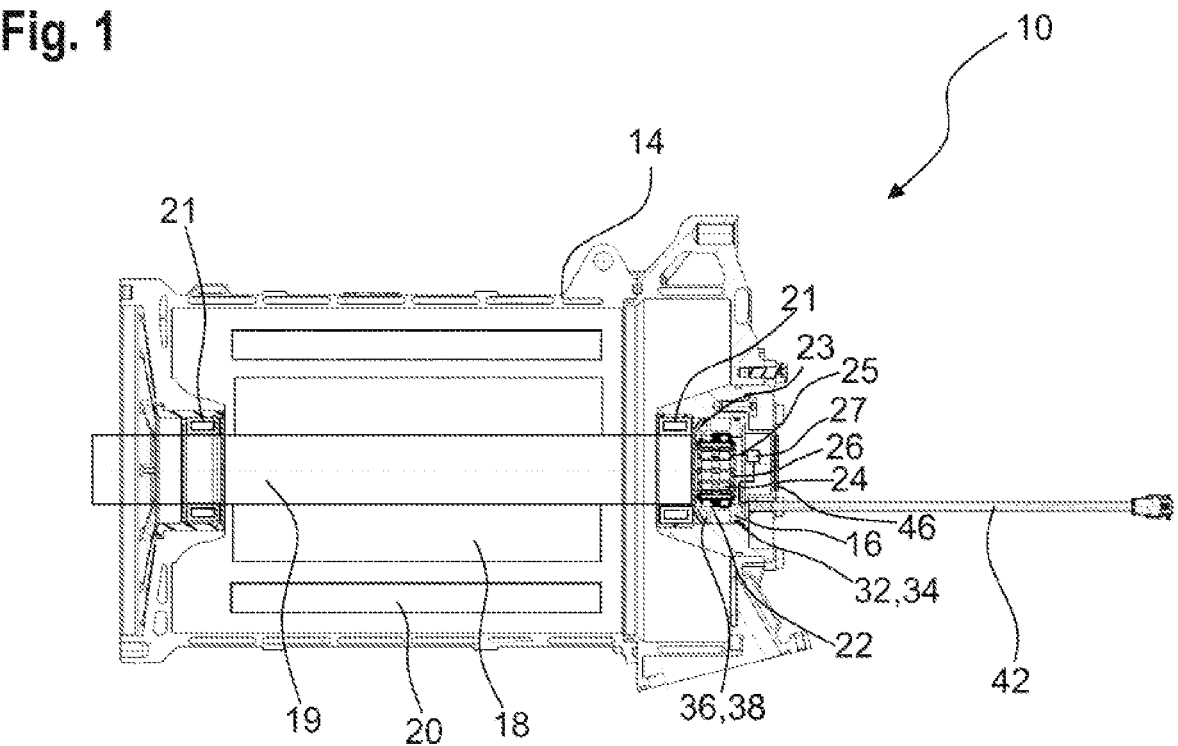
FIG. 1 shows a sectional illustration through a motor assembly according to an embodiment of the invention.

FIG. 1 shows a sectional illustration through a motor assembly 10 comprising an electric motor 12, which is accommodated in a motor housing 14, and a rotor position sensor 16. The electric motor 12, which comprises a rotor 18 and a stator 20, is indicated only schematically for reasons of simplicity.

The motor assembly 10 furthermore comprises a drive shaft 19 which is mounted by way of two roller bearings 21. In order to allow a certain amount of play, one of the roller bearings 21 is situated on a spring element 23, in particular on a plate spring.

The motor housing 14 is preferably of multipartite design for reasons of easier production.

A major portion of the rotor position sensor 16 is received in the motor housing 14 and fastened, in particular screwed, to the motor housing 14. In this case, the rotor position sensor 16 protrudes into the motor housing 14 in such a way that it can sense a rotational position of the rotor 18, this also being referred to as the angular position.

Figure 2:
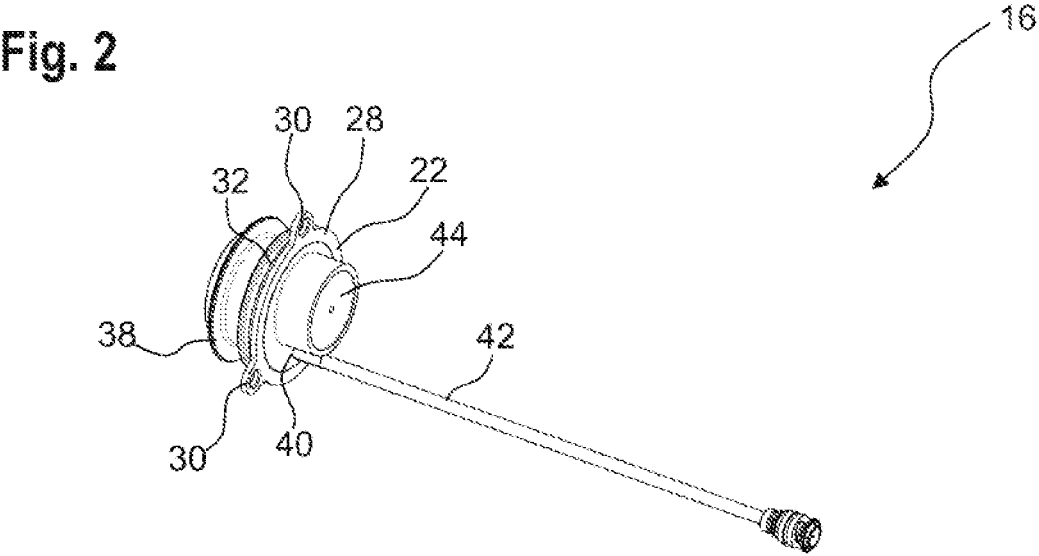
FIG. 2 shows a perspective view of a rotor position sensor according to an embodiment of the invention.
Figure 3:
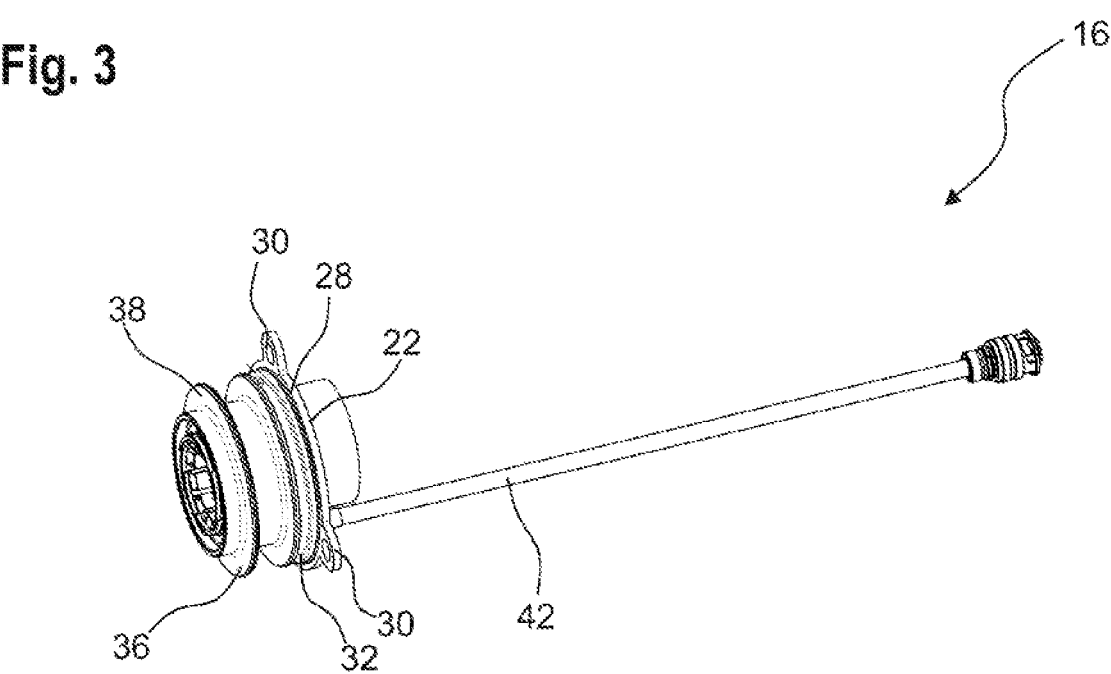
FIG. 3 shows a further perspective view of the rotor position sensor from FIG. 2.

FIGS. 2 and 3 each show a perspective view of the rotor position sensor 16.

The rotor position sensor 16 has a sensor housing 22. The sensor housing 22 is preferably an injection-molded component, that is to say a component produced in one piece.

A rotor position sensor rotor 24 and a rotor position sensor stator 26 are accommodated in the sensor housing 22, as shown in FIG. 1.

In addition, lines 25 to the stator coils of the rotor position sensor stator 26 and a control and/or evaluation unit 27, which is connected to the lines 25 in a signal-transmitting manner, are provided. These are schematically illustrated in FIG. 1.

Furthermore, various geometric structures are formed on the sensor housing 22. Amongst other things, reinforcement of the sensor housing 22 can be provided by way of the structures, so that the sensor housing is of correspondingly mechanically robust design.

In addition, an encircling flange 28, which has a plurality of fastening or screw-on lugs 30, is formed on the sensor housing 22 of the rotor position sensor 16.

Furthermore, the sensor housing 22 has a groove 32 which is preferably formed on the sensor housing 22 in an encircling manner.

A seal 34 is arranged in the groove 32. The seal 34 can be, for example, an O-ring which is inserted into the groove 32. The seal 34 can also be injection molded onto the sensor housing 22. A seal 34 that has been fitted by injection molding has the advantage that it cannot slip during assembly.

For example, the seal 34 has been produced with the sensor housing 22 using a two-component injection-molding process, as a result of which it is arranged on the sensor housing 22 in a cohesive manner.

The seal 34 is provided on the outside of the rotor position sensor 16, more precisely on the outside of the sensor housing 22, in any case.

The groove 32 is formed, with regard to a mounted state of the sensor housing 22, on a side of the sensor housing 22 that is directed toward the motor assembly 10 as viewed from the flange 28.

Instead of a groove 32, the sensor housing 22 can have only a sealing surface. A liquid seal can be applied to the sealing surface or, as already described in connection with the groove 32, a seal can be fitted by injection molding, in particular produced using the two-component injection-molding process.

The sensor housing 22 also has a contact area 36 which is provided on an encircling, radially outwardly extending collar 38 on the sensor housing 22. The contact area 36 serves for making contact with the spring element 23.

A cable bushing 40 for a sensor cable 42 is also provided in the sensor housing 22 of the embodiment shown.

The sensor cable 42 can have been integrated in the sensor housing 22 during production of the sensor housing 22, for example can have been encapsulated by injection molding by the material of the sensor housing 22. This means that the sensor cable 42 has been inserted into a mold during production of the sensor housing 22, into which mold the material for the sensor housing 22 was then introduced in order to produce the sensor housing 22.

In this respect, the sensor cable 42 can be integrated in the sensor housing 22. As a result, the cable bushing 40 is sufficiently well sealed off with respect to the outside.

Furthermore, a functional area 44 on which a pressure equalization element 46 is applied is provided.

FIG. 2 does not illustrate the pressure equalization element 46 for the purpose of visibility of the functional area 44. In this case, the functional area 44 is an outer side of the sensor housing 22, which is arranged outside the motor housing 14 or forms an outer surface of the motor assembly 10 in the assembled state of the rotor position sensor 16.

The sensor housing 22 is of one-piece design, that is to say the flange 28, the groove 32, the collar 38, the cable bushing 40 and/or the functional area 44 are jointly integrally formed in the sensor housing 22.

Owing to the above-described geometry of the sensor housing 22, the rotor position sensor 16 is formed in such a way that it can fulfill various functions during the assembly and during the operation of the motor assembly 10. In this case, the rotor position sensor 16 forms an inherently closed unit. This means that the rotor position sensor 16 can be assembled in a single assembly step.

When the rotor position sensor 16 is fastened to the motor housing 14 as shown in FIG. 1, the sensor housing 22 forms a cover for closing the motor housing 14. In particular, the flange 28 forms a portion of the cover. That is to say, the rotor position sensor 16 closes the motor housing 14 with respect to the outside, at least on the side on which the rotor position sensor 16 is received in the motor housing 14.

When the rotor position sensor 16 is inserted during the assembly of the motor assembly 10, the seal 34 seals off the motor housing 14 with respect to the outside.

In addition, when the rotor position sensor 16 is inserted into the motor housing 14, the contact area 36 comes into contact with the spring element 23 and pretensions it.

Furthermore, the rotor position sensor 16 serves as a pressure equalization element.

What is claimed is:

1. A rotor position sensor for a motor vehicle for sensing a rotational position of a rotor of an electric motor, the rotor position sensor comprising:
   a sensor housing in which the components of the rotor position sensor are accommodated,
   wherein at least a portion of the sensor housing forms a cover for closing a motor housing of the electric motor,
   wherein the sensor housing has a flange for fastening the rotor position sensor to the motor housing of the electric motor,
   wherein the cover is formed by the flange and a side of the sensor housing,
   wherein the sensor housing has a contact surface which serves for making contact with a spring element,
   wherein the contact surface serves to retain the spring element and thereby to pretension a roller bearing that rests on the spring element when the rotor position sensor is mounted, and
   wherein the contact surface is formed on an encircling, radially outwardly extending collar on the sensor housing.

2. The rotor position sensor according to claim 1, wherein a seal for sealing off the motor housing of the electric motor is provided on an outside of the rotor position sensor.

3. The rotor position sensor according to claim 2, wherein the seal is provided on an outside of the sensor housing.

4. The rotor position sensor according to claim 2, wherein the seal is arranged in an encircling groove or on a sealing surface on the sensor housing.

5. The rotor position sensor according to claim 1, wherein a pressure equalization element is integrated in the sensor housing.

6. The rotor position sensor according to claim 1, wherein a cable bushing for a sensor cable is provided in the sensor housing, and/or a sensor cable is at least partially integrated in the sensor housing.

7. A motor assembly comprising:
   an electric motor which is accommodated in a motor housing, and
   the rotor position sensor according to claim 1, wherein:
   the rotor position sensor is at least partially received in the motor housing and fastened to the motor housing, and
   the rotor position sensor closes the motor housing with respect to the outside at least on a side on which the rotor position sensor is received in the motor housing.

* * * * *